United States Patent

[11] 3,542,322

| [72] | Inventor | Martin Dvorin<br>Brighton, New York |
|---|---|---|
| [21] | Appl. No. | 729,737 |
| [22] | Filed | May 16, 1968 |
| [45] | Patented | Nov. 24, 1970 |
| [73] | Assignee | Bausch & Lomb Incorporated<br>Rochester, New York<br>a corporation of New York |

[54] VIBRATION ISOLATION SYSTEM AND ISOLATOR THEREFOR
6 Claims, 6 Drawing Figs.

[52] U.S. Cl. ..................................................... 248/22,
248/24, 248/358; 267/1
[51] Int. Cl. ..................................................... F16f 3/00
[50] Field of Search .......................................... 248/9, 13,
22, 24, 358, 350; 267/1(153)

[56] References Cited
UNITED STATES PATENTS
| 2,386,248 | 10/1945 | Marzetti .......................... | 248/22 |
|---|---|---|---|
| 2,597,244 | 5/1952 | Hussman ......................... | 248/22 |
| 2,683,007 | 7/1954 | Iredell ............................ | 248/24X |
| 2,739,774 | 3/1956 | Crede ............................. | 248/24 |
| 2,864,573 | 12/1958 | Olley et al. ...................... | 248/9 |
| FOREIGN PATENTS |
| 303,004 | 8/1929 | Great Britain .................. | 248/22 |
| 618,497 | 10/1958 | Italy ............................... | 267/1 |

Primary Examiner—Roy D. Frazier
Assistant Examiner—J. Franklin Foss
Attorney—Frank C. Parker and Bernard L. Sweeney ABSTRACT: A vibration isolation system which includes one or more tiers of three-point isolation loading. Each tier thereof includes three vibration isolators held in recesses in the base of the upper structure to be isolated. The isolators are constructed of lengths of tubular resilient material. In the vibration isolation system, the axes of the separate isolators are inclined to each other by approximately 120°.

Patented Nov. 24, 1970

3,542,322

MARTIN DVORIN
INVENTOR.

BY

AGENT

3,542,322

VIBRATION ISOLATION SYSTEM AND ISOLATOR THEREFOR

BACKGROUND OF THE INVENTION

This invention is related to vibration isolation systems and isolators therefor and is more particularly concerned with vibration isolation systems for use with operating optical electronic or optical instruments and vibration isolators of a generally tubular construction.

There are numerous types of optical and/or electronic instruments of high quality which suffer greatly from existing vibratory conditions inherent in the environment. For example, these energy sources may be a high-speed motor, the periodic disturbance generated by many types of machinery, traffic passing along a nearby roadway, or even that caused by persons walking through the area where the instrument is in operation. Some examples of equipment in which such vibration can cause a serious degradation of performance are: optical equipment such as high-power microscopes, microcircuit photo processing alinement equipment, electron microscopes, interferometric film thickness measuring devices; electronic equipment such as microcircuit electrical test probes, microphonic sensitive amplifiers; and precision balances.

There are two general approaches to isolating these instruments from the sources of vibratory energy. First, the sources may be isolated from the surrounding environment. This is generally economically infeasible as there are too many sources from which such excitation eminate. Therefore, the second approach is generally accepted as being the more sensible direction to take; namely, to isolate the individual sensitive instrument from the surrounding environment.

Isolating an instrument from the surrounding environment has been practiced for many years. However, these methods are generally designed for specific installations and conditions and are generally large and quite expensive to design and produce. Many of these instruments are portable in nature, and; therefore are subject to a wide variety of conditions. Also, many of these instruments are used by institutions which cannot afford the expense of designing and constructing such an isolation system, such as schools or small laboratories.

SUMMARY OF THE INVENTION

It is therefore an object of this invention to provide a vibration isolation system and the isolators therefor which provide vibratory isolation for such instruments in the ranges of frequencies to which they, the instruments, are most susceptible, yet at a very nominal increase in cost.

Another object of the invention is to provide such a system and isolators therefor which may be readily adapted for use with existing instruments.

A further object of the invention is to provide such a system and isolators therefor which may be designed for a general class of instruments and thereafter quickly, but accurately, modified for an individual application, when necessary.

A still further object of the invention is to provide such a system and isolators therefor which is readily adaptable for use with a wide range of sizes and weights of instruments.

Briefly, the invention in its broadest aspect is a vibration isolation system for sensitive electronic and optical instruments, the system being placed between the instrument and a surface which is a source of vibratory excitations, generally a bench top. The vibration isolation system includes a base and a plurality of at least three groups of at least one each of vibration isolators. Each isolator is open-ended being of generally tubular form in an unloaded condition; is formed of a prescribed resilient material having known vibration isolating characteristics; and is of a prescribed length, diameter, and wall thickness, such prescribed characteristics being determined by the weight of the instrument and the frequencies emitted by the source of vibratory excitations. Each group of isolators is located between the base and the bench top, the axes of each isolator in each separate group being substantially parallel to a separate one of the sides of a polygon having a like plurality of sides.

Further objects, advantages, and features of the invention will be apparent in the arrangement and construction of the constituent parts in detail as set forth in the following specification taken together with the accompanying drawing.

DETAILED DESCRIPTION OF THE PREFERRED EMBODIMENTS

Figure 1:
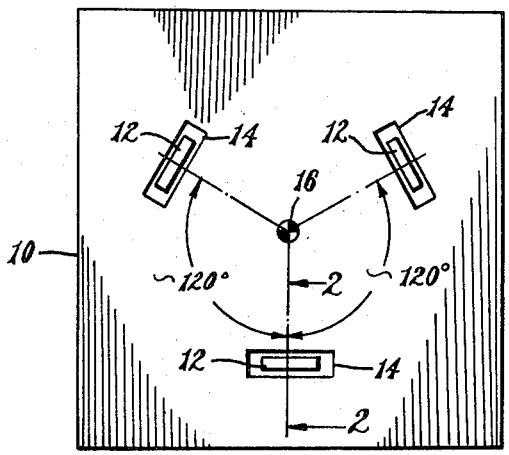
FIG. 1 is a bottom view of a base with the isolators in position.

Referring now to FIG. 1, there is shown a first embodiment of the present invention. Like reference numerals in the FIGS. refer to identical parts. In this FIG., which shows a bottom view of a base 10 of an instrument, a plurality of vibration isolators 12 are mounted in recesses 14 in the base 10. The recesses 14 are located approximately at the midpoint of the sides of a regular polygon having a like plurality of sides. The center of the regular polygon is approximately coincident with the vertical projection of the center of gravity 16 of the instrument into the base 10. However, the present invention also contemplates the employment of an irregular geometrical form as well.

In the embodiment shown, three vibration isolators 12 are utilized. The isolators 12 are tubular in form and will be described in greater detail hereinafter. The axes of the isolators 12 are disposed so as to form an equilateral triangle about the center of gravity 16. This is the preferred configuration. However, it may be foreseen that the location of the isolators might be altered one to another or in their relationship to the center of gravity. Such alteration would not necessarily prevent the satisfactory operation of the isolation system; but rather that the loading of the individual isolators might be significantly different. Such an unbalanced loading would cause the individual isolators to respond with different natural frequencies of vibration. This condition, however, may be averted by selection of isolators with different isolating characteristics to accommodate the loading unbalance.

Figure 2:
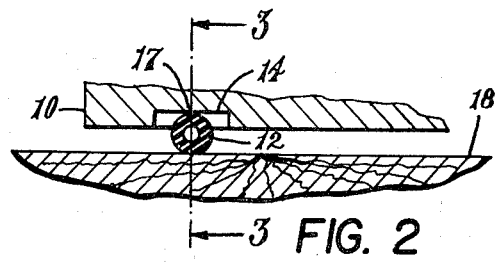
FIG. 2 is an enlarged partial side view in section along 2-2 in FIG. 1.

Referring now to FIG. 2, wherein an isolator 12 is shown in cross section, it will be seen that the width of the associated recess 14 in the base 10 is greater than the width of the isolator 12. If the isolator 12 were totally collapsed, the isolator still would not equal the width of the recess 14.

The depth of the recess 14 is such that the isolator 12 is not permitted to totally collapse. Before total collapse occurs, the base 10 comes to rest directly on surface 18. This prevents the permanent deformation and consequence degradation of performance of the isolator 12 when heavily overloaded. This protection is a primary function of the recesses 14. The isolator 12 is shown between the base 10 and the top 18 of a bench on which the instrument rests. Means 17 for attaching the isolator 12 to the base 10 in recess 14 may be used if desired; however, the use of such a means has not been found to be necessary, the isolators 12 may be merely placed in the recesses 14. A cement or double faced adhesive tape has been used successfully to secure the isolators 12 in the recesses 14. The primary purpose in securing the isolators in the recesses is to acquire greater ease of handling.

Figure 3:
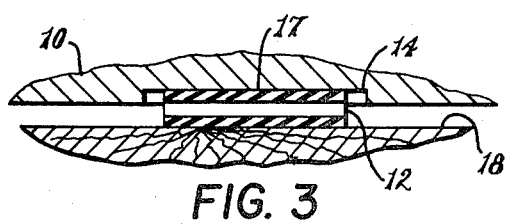
FIG. 3 is an enlarged partial front view in section along 3-3 in FIG. 2.

FIG. 3 shows the same isolator in longitudinal section. Here again, the length of the recess 14 exceeds the length of the isolator 12.

In the case of the preferred arrangement of the invention shown in FIG. 1, the alinement of the isolators tends to separate any vibratory excitation into components in response to which the separate isolators can react. The isolators tend to absorb energy when the frequency of the excitation is above 1.414 times the natural frequency of the instrument and associated isolators. The natural frequency of an elastically sprung system is a function of the static elastic deflection, $\delta h_{st}$ $$fn = \frac{1}{2\pi}\sqrt{\frac{9}{\delta h_{st}}} = \frac{3.13}{\sqrt{\delta h_{st}}}$$

n where $fn$ = natural frequency and $g$ = gravitational acceleration. The relative dimensions and the material used for the isolators determine the amount of static deflection and may be calculated using well-known principles. The designer specifies isolators which deflect sufficiently to allow the natural frequency to remain well below the frequency of the expected vibratory excitations. The designer chooses an isolator material and size according to the frequency desired to be isolated and the weight of the instrument. In the present isolator, much adjustment is possible, particularly in the field, by varying the length of the isolator, which may be accomplished by removing a section of the isolator at one end, thereby lowering the natural frequency.

Figure 4:
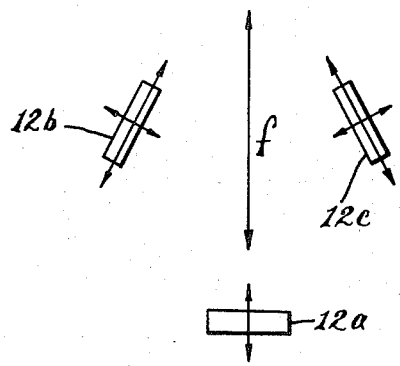
FIG. 4 is a plan view of three isolators showing the manner by which the isolators decouple the vibratory forces.

If the excitation is purely vertical, the above relationship states the total mode of isolation afforded by the system. However, if the excitation is other than purely vertical, the arrangement of the isolators tends to decouple the excitation into a number of components. Referring now to FIG. 4, three isolators 12a, 12b, and 12c are shown configured as in FIG. 1. Also shown is an arrow F representing a vibratory excitation which acts in the direction of the arrow. This excitation tends to cause isolator 12a to roll about its axis as indicated by the small arrow located on isolator 12a. In addition, the driving force tends to cause isolators 12b and 12c to roll; however, a component of force is also directed axially on isolator 12b and 12c tending to cause a sliding action. The frictional resistance to the sliding motion is much greater than the frictional resistance to rolling motion. This arrangement of the isolators separates the driving excitation into components which are either vertical, horizontal and parallel to the axis of the individual isolator, or horizontal and perpendicular to the axis of the individual isolators.

Figure 5:
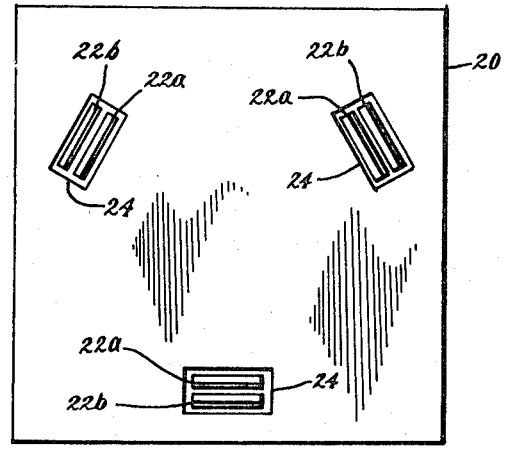
FIG. 5 is a bottom view of a second embodiment of the invention.

Referring now to FIG. 5, there is shown a second embodiment of the invention. In this embodiment which may be used on instruments where the base area is small relative to the weight, a plurality of isolators, in this case two, 22a and 22b are located in parallel arrangements in the recesses 24 on the base 20 of an instrument. Here a plurality of isolators arranged parallel to each other in each recess provide a means for isolating an instrument where if only a single length of isolator is used, the size of the base is such that the isolator cannot be mounted in the existing base in a single piece.

Figure 6:
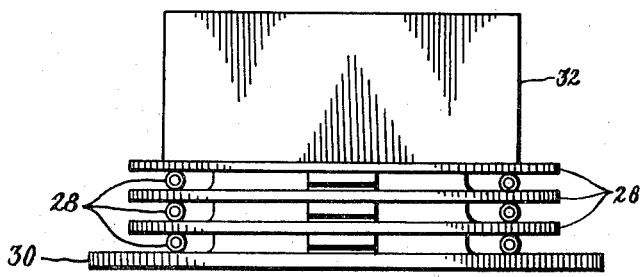
FIG. 6 is a side view of a third embodiment of the invention.

In FIG. 6, a third embodiment of the invention is shown wherein a plurality of base plates 26 each employing a plurality of isolators 28 support and isolate an instrument 32 from vibrations transmitted through surface 30 which may again be a bench top. This configuration is utilized for achieving a high degree of isolation, because the various base plate-isolator groups may be tuned to isolate different frequencies thereby providing virtually complete isolation for the instrument.

It will be noted, that in FIG. 6, the isolators 28 are not recessed as in the previous embodiments. The recesses function primarily is to protect and locate the isolators. Therefore, if care is exercised in locating the isolators and the protection requirement is minimal, the recesses may be eliminated.

I claim:

1. A vibration isolation system for sensitive electronic and optical instruments, the system being placed between the instrument and a surface which is a source of vibratory excitations, generally an equipment bench top, the vibration isolation system which comprises:

a base having a plurality of at least three rectangularly shaped recesses in the bottom thereof, the major axes of the recesses being segments of the respective sides of a polygon having a like plurality of sides;

a like plurality of groups of at least one each of vibration isolators, each isolator being of generally tubular form in an unloaded condition, being formed of a prescribed resilient material having known vibration isolating characteristics, and being of a prescribed length, diameter, and wall thickness, such prescribed characteristics being determined by the weight of the instrument and the frequencies emitted by the source of excitations;

each group of isolators being located in a separate one of the recesses, the axes of each isolator being substantially parallel to the major axis of the recess; and each recess being of greater length than the isolators, of greater width than the sum of the diameters of the isolators in the group located therein; and of a depth such that before complete collapse of the isolator, the base will rest directly upon the surface.

2. A vibration isolation system according to claim 1, in which said polygon is substantially regular and has its geometrical center substantially coincident with the projection of the combined center of gravity of the instrument and base onto the base.

3. A vibration isolation system according to claim 2, which is further characterized by at least one additional substantially identical vibration isolation system cascaded in a serially arranged configuration atop said first system.

4. A vibration isolation system according to claim 2, in which said base has three rectangularly shaped recesses.

5. A vibration isolation system according to claim 4 in which each of said groups of vibration isolators includes a single isolator.

6. A vibration isolation system according to claim 5 in which said base is an integral portion of the instrument to be isolated, and which further includes means for retaining said vibration isolators on said recesses.